INVENTOR
SEBASTIAN BONET SIRERA

Feb. 1, 1966 S. B. SIRERA 3,232,826
PROCEEDING WITH ITS CORRESPONDING APPARATUS FOR
THE MANUFACTURING OF FIBRO-CEMENT ARTICLES
Filed May 10, 1962 12 Sheets-Sheet 11

INVENTOR
SEBASTIAN BONET SIRERA

BY

ATTORNEYS.

United States Patent Office
3,232,826
Patented Feb. 1, 1966

3,232,826
PROCEEDING WITH ITS CORRESPONDING APPARATUS FOR THE MANUFACTURING OF FIBRO-CEMENT ARTICLES
Sebastian Bonet Sirera, Calle del Conde de Altea 4, Valencia, Spain
Filed May 10, 1962, Ser. No. 193,774
Claims priority, application Spain, May 29, 1961, 267,769
15 Claims. (Cl. 162—218)

The making of fibro-cement items, starting from a mixture of cement, asbestos and water, as is presently accomplished, or at least, according to the most widely used methods for the manufacture of plain or undulated plates and of tubes, requires large and very expensive plants, which occupy much space. These plants start production with so-called cardboard making machines to form the plates and which require an expensive and frequent consumption of endless felts. The plates are treated in other machines for the forming of the light tubes. Corrugating machines are necessary if corrugated roofing plates are to be made. Pressure pipings require very expensive plants and a slow manufacturing process with small yields.

The invention has as its aim to provide a method and an apparatus for the manufacturing of fibro-cement items, particularly of those constituted by bodies of revolution, in which the unfavorable conditions and disadvantages briefly outlined above of methods and apparatus are overcome and with the following advantages.

The plant is simplified and the apparatus is of low cost in relation to the production capacity.

Endless felts and cloths are unnecessary, thereby greatly reducing costs.

It is possible to use any type and any length of asbestos, avoiding the problems arising out of different drainage grades of the asbestos fiber presently used, and resulting in a continued and uniform manufacturing process, unaltered even if asbestos fibers of large or small filtration capacity or long or short length are used.

Cheap asbestos at lower concentrations may be used without any serious harm to the coefficient of resistance.

Several tubes may be manufactured at the same time, and, also plates and tubes may be simultaneously made.

The production rate is increased because the method is quicker; the apparatus and the method have been orientated to avoid lost times in a continuous work process which simultaneously molds some elements, while others are being dismounted and new molds being placed in position.

Pieces are obtained which have the fiber direction orientated in the normal sense of the generatrix, although, if desired, this orientation of the fibers can be suppressed, and braced fibers, giving a great strength to the pieces in all directions, can be obtained.

The method according to the invention essentially involves: the introduction of a hollow molding body having permeable walls, accompanied or not with satellite bodies of the same characteristics, into a chamber; closing this chamber and injecting into it a fluid paste of cement, asbestos and water under pressure, between 2 and 4 atmospheres, until the chamber is nearly filled and the hollow forming bodies entirely submerged in the fluid paste mass; a continued turning movement is imparted to the hollow bodies inside the mass, although it is also possible to keep them without movement, in such a way that the pressure in the chamber adheres successive layers of paste to the external surfaces of the hollow bodies, the water contained in the adhered paste passing partially into the insides of the hollow bodies, from where it is continuously evacuated to the exterior of the chamber; and feeding paste continuously to the chamber to compensate for the loss of volume of the water evacuated and to avoid the reduction of pressure within the chamber.

When no more water is evacuated, the pressure in the chamber is unable to adhere any more paste upon the permeable surfaces of the hollow bodies. The following phase of the process is then started: the inlet of paste to the chamber is closed, the outlet duct is opened, at the same time a current of air or any other gas is introduced into the chamber under pressure of from 2 to 4 atmospheres; the pneumatic pressure expels out of the fluid asbestos, cement and water paste mass of the chamber, carrying it into another similar chamber in which other hollow molding bodies have been previously introduced; the above steps are repeated in the second chamber.

The air or gas introduced under pressure into the first of the forming chambers, passes through the layers of soft paste adhered to the molding bodies and further dehydrate them, the water and gas going on through the mass and the permeable mold walls into the inner side of the hollow bodies, from where they pass to the exterior, thus obtaining a strong compactness of the adhered mass. Then the supply of air or gas to the chamber is shut off, the chamber is opened and the molding bodies covered with the adhered paste are extracted. The mass is cut to facilitate the removal, in the case of tubes, calendered to obtain plates.

The described operations are accomplished alternately in two or more forming chambers so as to continuously perform the steps of piece forming, dehydration and change of molds.

In order to facilitate a more complete understanding of the process described in a general way in the foregoing paragraphs, as well as the apparatus used in its execution, an example of the method and apparatus is illustrated in the drawings. The drawings are illustrative only, and not to be taken in a restrictive or limited sense.

Referring now more particularly to the drawings, the apparatus utilized in the invention process includes two large forming chambers 1 and 2 (FIG. 1), which are alternately supplied and filled with a mixture of asbestos, cement and water in fluid condition, which mixture will be hereinafter referred to as the paste. The feeding of paste is accomplished through the pipes 3 and 4, the paste supply to the chamber 1 being controlled by the by-pass cock 5 operated by the lever 6. The lever is moved by the piston rod of double acting pneumatic cylinder 7, 9 and 10 being the two air supply tubes to said cylinder. The paste supply to chamber 2 is controlled through the by-pass cock 11 operated in its opening and closing movements by the lever 12, and similarly moved by the double acting, pneumatic cylinder 13 having air inlet and outlet tubes 14 and 15.

The paste supply tubes 3 and 4 are connected to the tank of a pneumatic paste injector, which is not represented as it is a known device. It consists substantially, in a tank with a palette agitator, connected by a tube to a pump having a helicoidal rotor and rubber stator to rack the paste from the agitator tank to that of the injector, to which the pump is connected by another tube. In the interior of the injector, there are helicoidal shovels moved by a motor and a water tight cell in the bottom, which includes manometer means to indicate the quantity of paste in the injector. The injector tank has a tube with a corresponding by-pass cock connected with an air compressor, so that air pressure will expel the paste from the interior of the injector tank through the tubes 3 and 4. The paste expelled by the injector is replaced by paste introduced by the helicoidal pump from the agitator tank.

Figure 11:
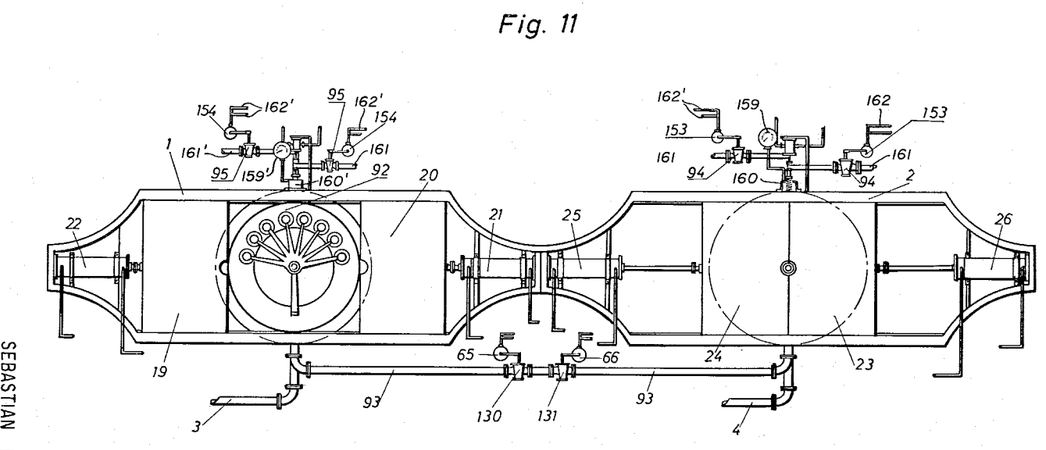
FIG. 11 is a front elevation of the molding chambers, one open and the other closed and showing the by-pass cocks for the paste from one chamber into the other and also the by-pass cocks for the air or gas.

On each one of the forming chambers 1 and 2 there are two by-pass cocks 94 and 95, FIG. 11, which are used to introduce air or any other gas under pressure into the chambers, either for transferring the paste from one chamber into the other, or for accomplishing the second dehydration of the tubes and plate already formed in the molds. Each one of said by-pass cocks 94, 95 is operated automatically by its respective hydraulic or pneumatic pressure cylinder, or jack 153, 154, although they can also be operated by hand at will.

Figure 3:
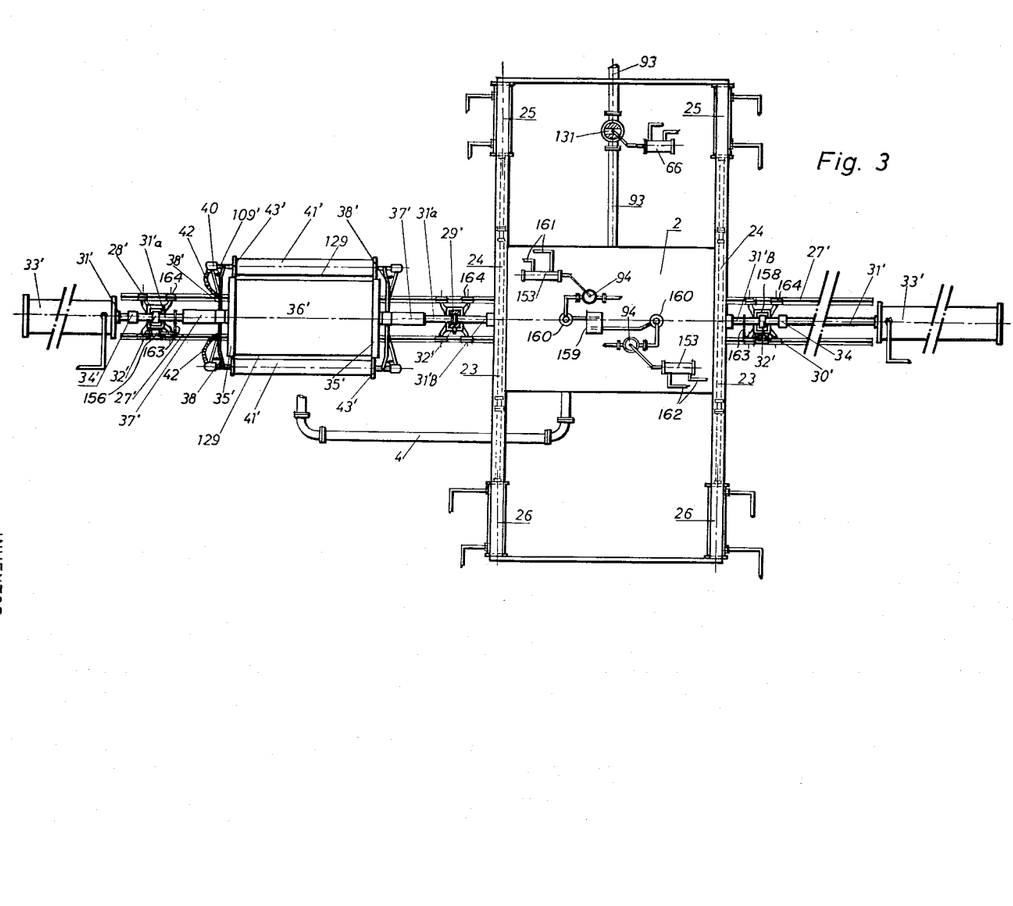
FIG. 3 is a plan view of a forming chamber similar to FIG. 2 but with closed doors.

In FIGS. 3 and 11 are also shown the tubes 161 and 161' that are connected to a compressed air reservoir (not shown on the drawing), the valves 160, 160' for the entrance of air into the chambers 1 and 2, the tubes 162, 162' that feed the cylinders 153, 154 with air or oil, and the manometers 159, 159' to measure the internal pressure of the chambers 1 and 2.

The chamber 1 has two sliding half doors arranged at one side, and another two equal half doors also referenced 19, 20, arranged at the opposite side. Chamber 2 also possesses two half doors 23, 24 at one side and similar half doors at the other side.

For water tight sealing of doors 19, 20, 23 and 24, their contact lines are provided with a recess supplied with an inflatable tube, which under pressure tightly seals the said contact lines, although any other sealing device can be used.

Figure 2:
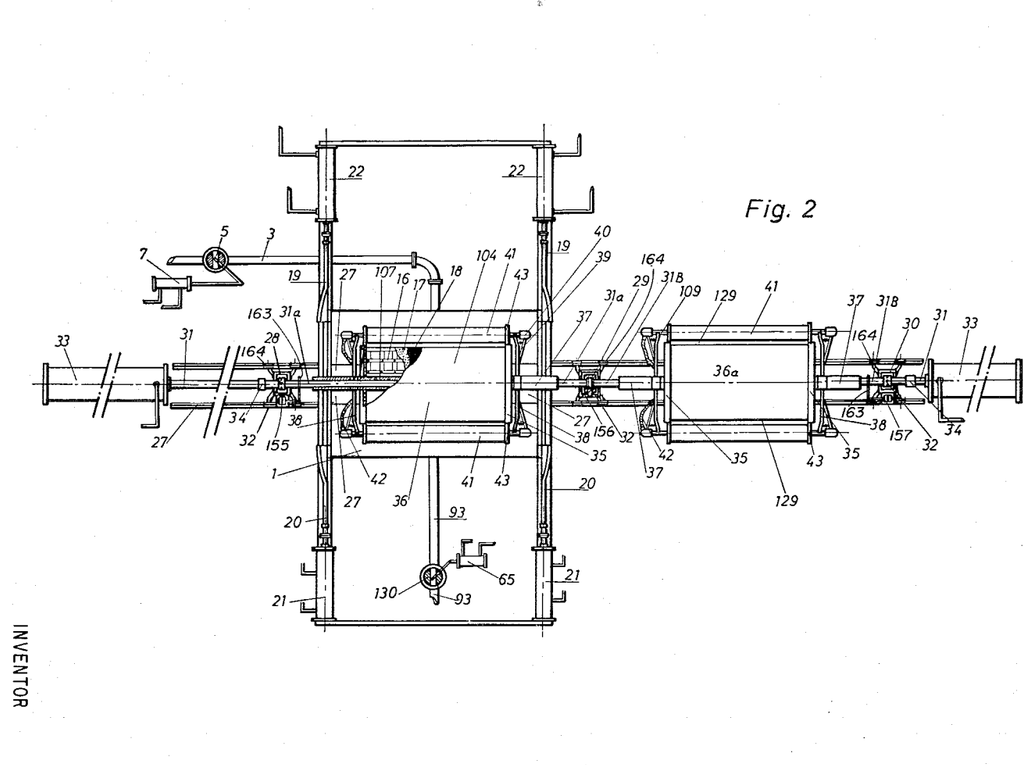
FIG. 2 is a plan view of a forming chamber with open doors and cut away in its upper part to show a set of molding bodies in the interior and another set outside, and ready to be inserted into the chamber to replace the first set when the pieces are formed.

The sliding doors 19, 20, 23 and 24 are hydraulically operated by cylinders 21, 22, 25 and 26 respectively In FIG. 2, the doors 19, 20 of chamber 1 appear in open position, while in FIG. 3 the doors 23, 24 of chamber 2 are closed.

In the interior at the centers of chambers 1 and 2 there are rails 27 and 27' which extend outside of said chambers.

The platforms 28, 29, 30 move over the rails 27, and sinularly platforms 28', 29', 30' will move over the rails 27'. Each one of these platforms is provided with four wheels 164 so that there are always two wheels in contact with the rails even when the platform slides over the space in which the rails are interrupted by the guides of the doors 19, 20, 23 and 24.

The sliding platforms 28, 29, 30, are joined by a tubular axle having the portions 31, 31a and 31b, while the three platforms 28', 29' and 30' are also joined by another tubular axle having portions 31', 31a' and 31b'. The axles are supported by bearings 32 and 32'.

The ends of the tubular axles 31 and 31' are connected to the piston rods of the hydraulic single acting cylinders 33 and 33'. These cylinders are arranged to exert their drive by hauling or pulling upon the tubular axles 31 and 31'.

The tubular axles joining the platforms are cut at their seat points corresponding to the platforms 29, 29' and also in other points near the platforms 28 and 28', and 30 and 30' so that the tube portions 31 and 31', connected to the cylinders 33 and 33' stay fixed and the portions 31a, 31b, 31a' and 31b' can turn independently.

On each one of the platforms 28, 28' and 30', 30 there is an electric motor 155, 156, 157 and 158 and a corresponding transmission 163 to the portions 31a, 31b, 31a' and 31b' of the axles to impart to the same a turning or rotating movement independent of the axle portions 31 and 31' which do not rotate.

The coupling sleeves 34, 34' absorb the rotating movement of the other axle portions so that portions 31 and 31' can be moved longitudinally by the hydraulic cylinders 33 and 33'.

Figure 6:
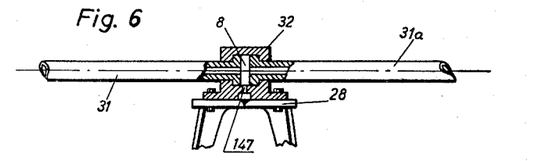
FIG. 6 is a fragmentary elevation of a tubular traction axle supporting car for the molding sets, shown partly in section to reveal the water evacuating device in the interior of the tube.

The coupling of tubes 31, 31a, 31b and 31a', 31b', which is accomplished over the platforms 28, 29, 30 and 28', 29' and 30', has a certain separation, and there is besides, an opening or hole on the bottom of the coupling bearings, to allow the outlet of liquid and gas circulating through the inside of said tubes. The detail of this is best seen in FIG. 6, in which the platform is marked 28, the bearings 32 and the coupled axles 31, 31a. Space 8 provides the separation between the tubes and opening 147 is the drainage opening.

When the axles 31 and 31' are moved by the hydraulic cylinders 33 and 31', only the platforms 29 and 29' will move inside of the forming chambers 1 and 2, the platforms 28, 28' or 30, 30', placing themselves facing the entrances of the forming chambers 1 and 2, which avoids that the platforms carrying electrical motors can get wet or be affected by the humidity prevailing in the forming chambers.

Figure 4:
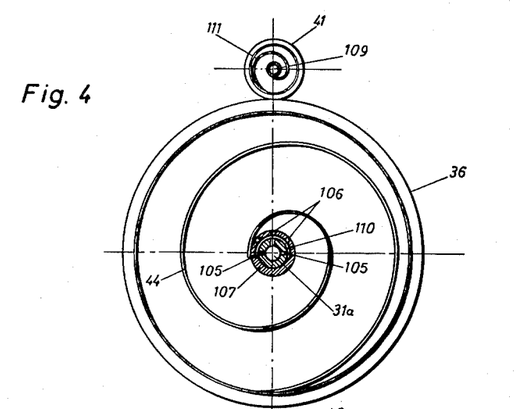
FIG. 4 is a transverse section of a forming drum and a roller, that is, two-piece forming molds, illustrating their internal water evacuating device.

The apparatus includes also two forming drums 36 and 36a, mounted to turn with axles 31a and 31b and two other drums 36' and 36a' coupled to turn with the axles 31a' and 31b'. Each one of these drums consists of two parallel discs 35 on drums 36 and 36a, and 35' on drums 36' and 36a'. These discs each have a central bush or sleeve 107 (FIGS. 2 and 4), which are solidly joined to the tubular axle 31a, in drum 36 and to their respective tubular axles in the other two drums. From disc to disc there are stretched cylindrical rods 16 (FIG. 2), a perforated plate, or any other means capable of forming a cylindrical cage or drum. On these rods 16 or other means substituting for them, is arranged a wire netting 17 of large mesh, and outside this, another wire netting of small mesh, the drum being externally lined with a thick cloth 104, preferably of synthetic fibers.

From the central bush 107 (FIG. 4) each of the drums has a plate 44 outwardly curved in spiral and joining the internal wall. This plate forms a water collecting device inside the drums. While the drums continuously turn, water is carried to the center sleeve, passes through the openings 106 and into a recess 110 in said bush and from here, through the openings 105, to the inside of the tubular axle 31a, or of the respective tubular axle of each drum. The axles constitute the evactuating ducts for the water in the drums.

The discs 35 and 35' have a larger diameter than that of the respective cylinders 36 and 36', extending beyond them to form a projecting flange.

Figure 5:
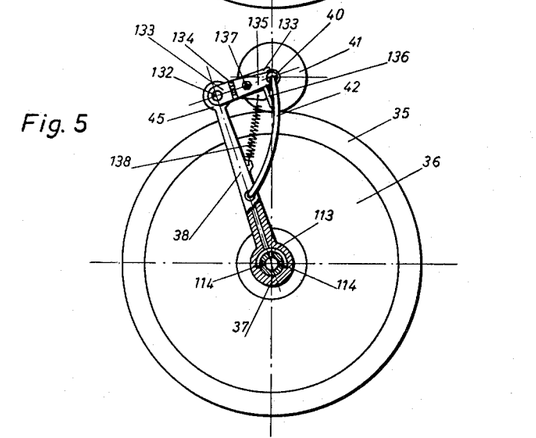
FIG. 5 is an end view of the forming drum and the forming roller illustrating means for coupling them to each other.
Figure 12:
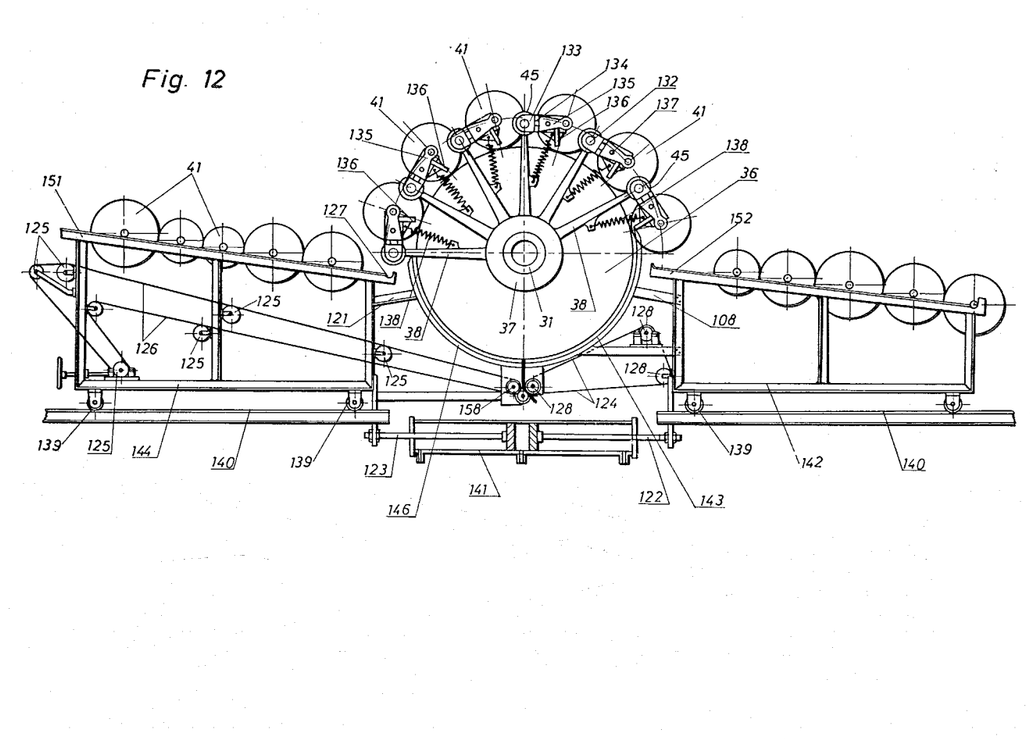
FIG. 12 is an elevation of a set of molds and the mechanisms for the loading and unloading of the tube forming rollers or molds on the central drum, which will generally be used to form plates.

On both sides of each of the drums 36, 36a, 36' and 36a' and around their respective tubular axles 31a, 31b and 31a', 31b', are provided two sleeves 37 and 37' FIGS. 3, 5 and 12) which constitute independent turning axles. Said sleeves 37, 37' have radial arms 38, 38', which terminate in outer ends 45 connected to the link 133, capable of turning on the rods 132. Link 133 has a fork, or half bearing 148, in which are coupled the tubular axles 109, 109' of the tube forming rollers 41, 41'. There may be as many rollers as desired although it is advantageous to mount as many of them as will fit in half of the perimeter of the discs 35, 35', as shown in FIGURE 12.

The tube forming molds 41 and 41' are equal or similar in construction to the drums 36, 36a, 36' and 36a'. That is, they are constructed by two end discs 43 and 43' of a larger diameter than the cylinders, so that the discs 35, 35' resting against discs 43, 43' result in a wide separation 129 between the surfaces of drums 36, 36' and of cylinders 41, 41'. The friction of the discs 35, 35' against the peripheries of discs 43, 43' causes a rotation of the molds 41, 41'. Each of the molds 41, 41' has also internally a spiral plate 111 (FIGURE 4) which collects the water and concentrates it over the central axle 109, so that through corresponding openings the water enters the interior of the axle from where it is evacuated. To this end, the terminals of the tubular axles 109 (FIGURES 13 and 14) terminate in conical portions obturated by mouthpiece stoppers 40 each having an axial hole 112, to which is connected a rubber tube 42 (FIGURES 2, 3, 5 and 17). Tube 42 carries the water to the hollow arm 38, from which it passes into the tubular axle 37 having internally a recess 113. From this recess the water passes into the tubular axle 31 through the holes 114.

Figures 14, 15, 16:
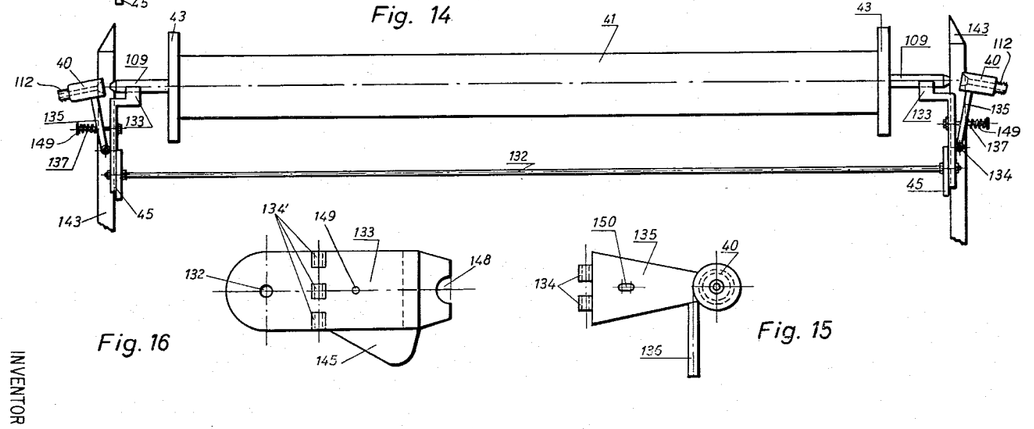
FIG. 14 is an elevation similar to FIG. 13 but with the roller in the position at the start of separation of the drainage bushes.
FIG. 15 is an end view of a drainage bush.
FIG. 16 is an end view of a supporting fork for the axle of a tube making roller.

The mouthpiece stopper 40 is secured to the piece 135 (FIGURE 15) having an operating arm 136 and which, by means of hinges 134, is articulately mounted on the hinges 134' of piece 133 (FIGURE 16). The mouthpiece stoppers 40 are pressed against the conical mouths of tubes 109 by the springs 137, arranged around a bolt 149, joining the pieces 133 through the holes 150 in piece 135, acting as a guide to the articulation of said piece 135. These is a small cam 145 on the piece 133 (FIG. 16), to which is secured one end of a spring 138 (FIG. 5), having its other end connected to the arm 38 in such a way that the strength of this spring forces the borders of discs 43, 43' to remain in permanent contact with the discs 36, 35' of the respective drum, although the central surfaces of the satellite rollers 41, 41' and of the principal drums 36, 36a and 36', 36a' will remain sufficiently separated as not to touch.

Figure 13:
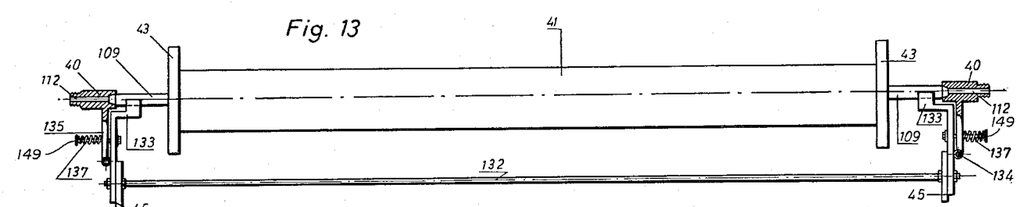
FIG. 13 is a side elevation of a tube forming roller with the drainage bushes in section and showing the means for mounting the roller on the drum.
Figure 17:
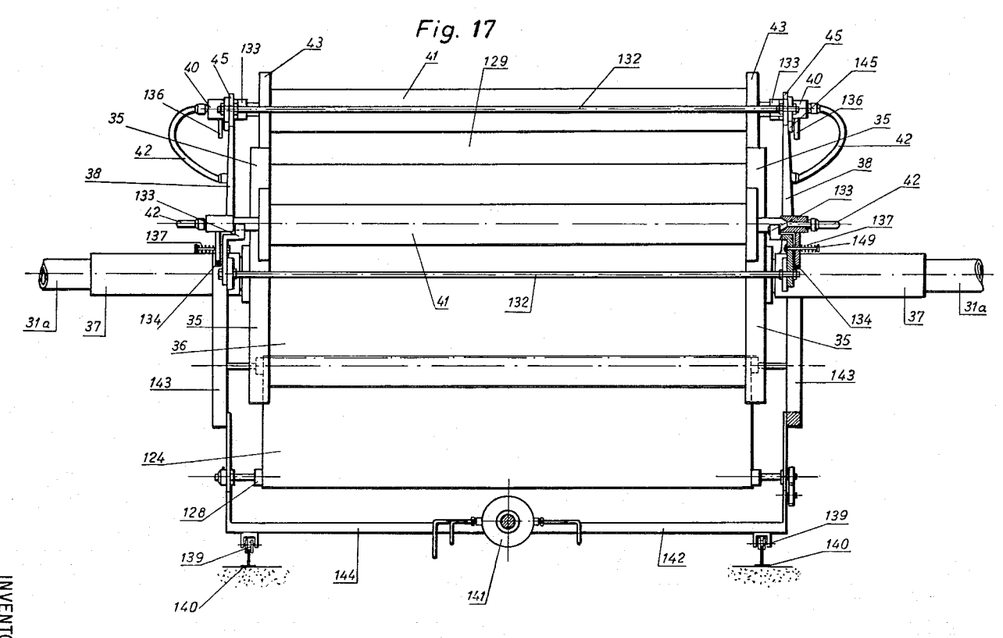
FIG. 17 is a side elevation of a set of molds composed of the central drum and satellite rollers.

The rods 132 connect pieces 133 to arms 38 and maintain them parallel as better shown in FIGURES 13, 14 and 17.

For loading and unloading of the cylinders 41, 41' on the arms 38, 38' of their respective drums 36, 36' the mechanism shown in FIGURES 12 and 17 is used. It comprises two frameworks 142, 144 each having two parallel gradient bars 151 and 152, respectively. The frameworks are provided with wheels 139 enabling them to roll along the rails 140, driven by the double acting hydraulic cylinder 141, having rods 122 and 123 secured to the frameworks.

Said frameworks have in their frontal portions the supporting arms 121 and 108, which bear upon two archlike bars 143 and 146, in such a way that when one of the frameworks gets near to the other and said bars touch, they form two semi-circumferences, one at each side of the drums 36 (or 36'). Bars 143, 146 have a triangular section to act as separating wedges of operating arms 136.

The mold 41 and 41' to be charged on the arms 38, are placed on the parallels 151. The sleeves 37 of axle 31 are turned and the arms 136, when struck against the curved bars 143 and 146, cause the pieces 135 to tilt, separating the mouthpieces 40 from the terminals of the axles 109 so that the cylinders 41 with the molded tubes which are mounted on the arms 38 (FIG. 12), are freed and fall upon the parallels 152, unloading themselves from the machine. When the cylinders 41 leave their supports 133, the contraction of the springs 138 causes that piece 133 to turn on its axle rod 132 and the cam 145 to touch the arches 143, 146, stopping the forks 148 at the precise position to establish contact with and take the axle ends 109 of the empty molds 41 on the parallels 151. The empty molds travel by gravity to seat in the recesses 127. When the arches 146 move to release the operating arms 136, springs 137 force the mouthpiece stoppers 40 to clamp and adjust themselves over the points of the tube 109 forming the axle for the waiting drum in recess 127. So each new drum becomes attached in turn to their supports 133 and arm 38.

An endless band 126 is stretched over the rollers 125 mounted on the framework 144. Another endless band 124 is stretched over the rollers 128 mounted on the framework 142. By means of these two endless bands, the fibro-cement layer formed around the drum 36 which is cut along one of its generating lines, causes said drum to turn and to deposit the layer on the endless bands which carry it outside of the machine.

The most important movements of the machine described heretofore, are the opening and closing of the doors of chambers 1, 2 and the movements of translation of axles 31, 31' which haul the forming elements 36, 36a, 36' and 36a' to the inside and outside of the forming chambers. The automation of these important movements is accomplished by hydraulic and pneumatic means, and will now be described.

Figure 7:
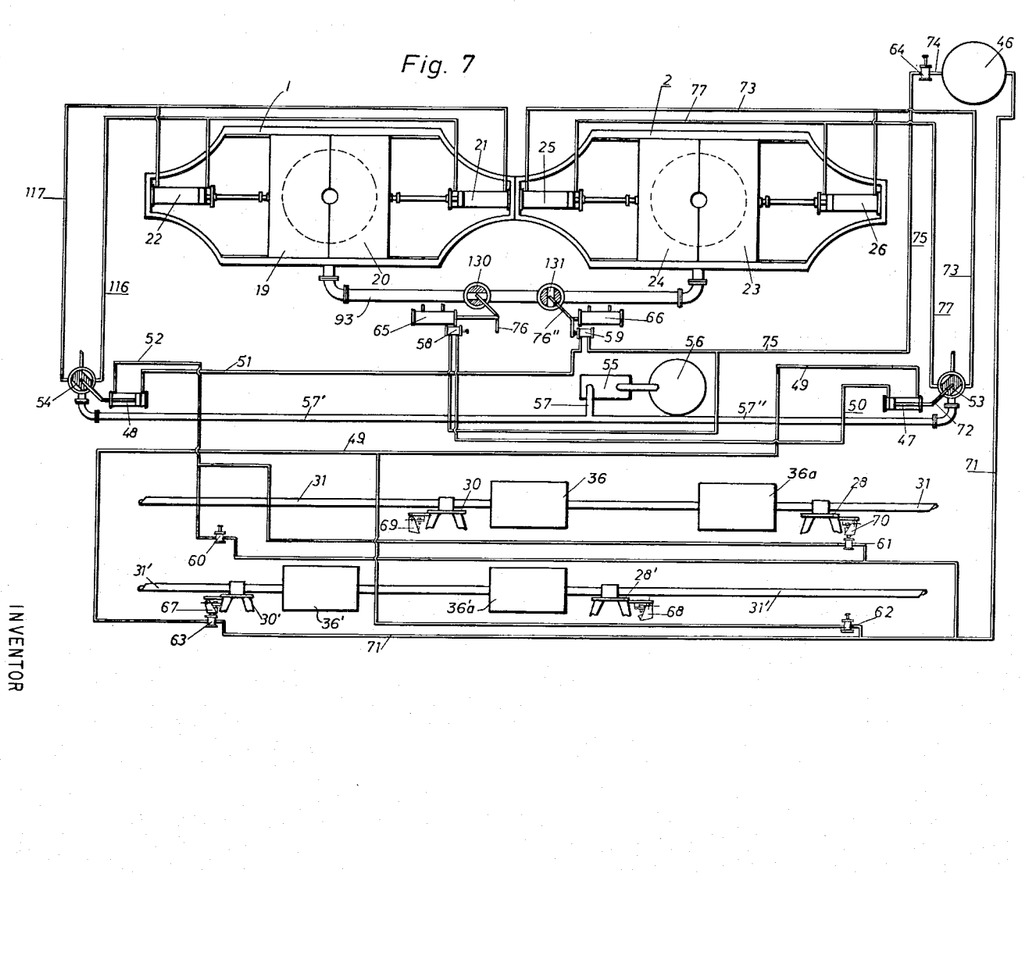
FIG. 7 is an end view showing the two forming chambers with the doors closed, and a diagram of the penumatic and hydraulic pipe circuits and cocks for closing and opening the doors and for moving the sets of molds in and out of the chambers.
Figure 8:
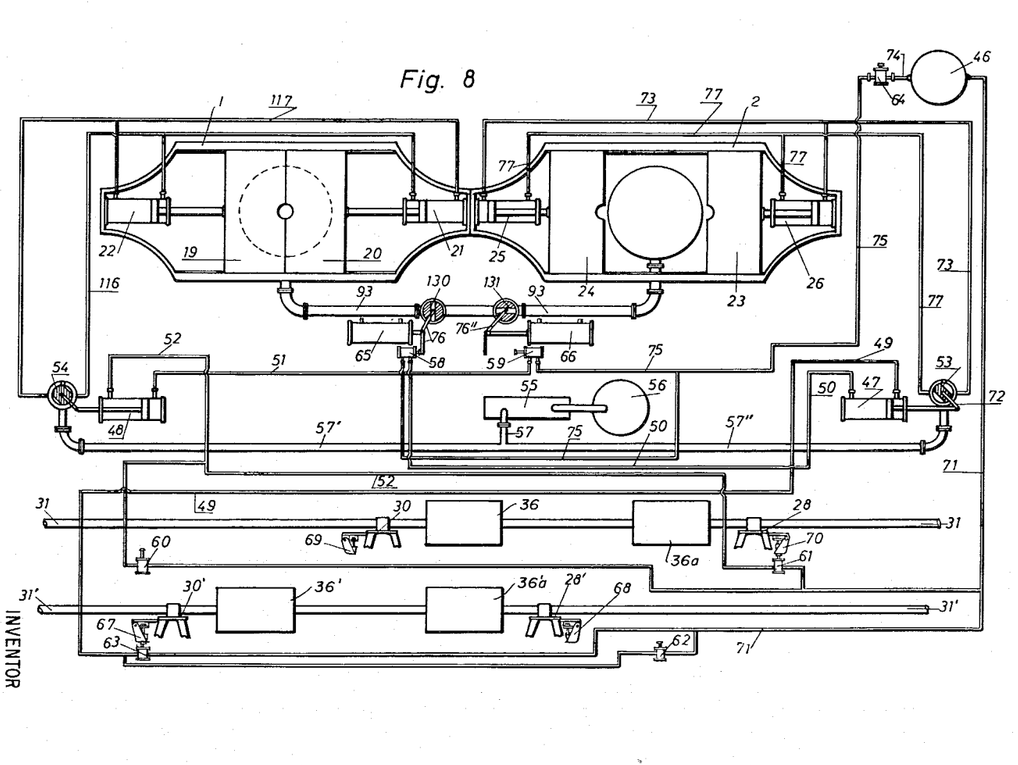
FIG. 8 is an end view of the two forming chambers, one with closed doors and the other with open doors and with the same of piping circuits scheme as in the foregoing figure, but with cocks and operating cylinders in the appropriate positions for this stage of the process.

In FIGURES 7 and 8 are shown diagrammatically the installation of hydraulic and pneumatic ducts, with their corresponding cocks and pressure jacks, or cylinders, push-button valves and other elements for automatically opening and closing the doors of chambers 1 and 2. These movements are accomplished alternatively and synchronized with the supply or exhaustion of paste to and from the interior of said chambers.

The pneumatic mechanism comprises compressed air reservoir 46 which is fed by a compressor, not shown. The pneumatic jacks 47 and 48 are a pair of double acting cylinders receiving pressure through the pipe lines 49, 50, 51, 52 to operate two four-way hydraulic cocks 53 and 54.

A hydraulic pressure pump 55, with its feed tank 56, furnishes fluid under pressure to the pipe line 57, which divides into two ducts 57' and 57".

The elements 58, 59, 60, 61, 62, 63, 64 are pneumatic pushbutton valves which will allow or prevent the passage of the compressed air from the compressed air reservoir 46. Each of these valves is conventional and of the type which is pressed to open and includes a spring normally closing the valve when the pushbutton is no manually or mechanically pressed. Each valve is also provided with a conventional exhaust port to the atmosphere which is opened when the pushbutton is not pushed to vent the duct in which the valve is installed to the atmosphere. The exhaust port is closed when the pushbutton is pressed. Valves of this type are commonly sold in Spain under the tradename Martonair. There are two pneumatic cylinders 65 and 66, whose operation controls the paste cocks 130, 131. Both these pneumatic cylinders 65 and 66 are connected to a source of air under pressure 46, and are operated automatically by conventional fluid pressure control devices, not shown, or by hand at will, as explained above with respect to the pneumatic pressure cylinders 153, 154 and as will be explained later with respect to fluid pressure cylinders 47, 48 and 25, 26. The tilting springs 67, 68, 69, 70 are fixed on the platforms 28, 30, 28', 30', which, in their turn, are fixed to the axles 31 and 31' and move longitudinally with them to operate the pushbutton valves 60, 61, 62 and 63.

Assuming that the platform 28' has reached the limit of its longitudinal movement, the spring 67 (FIG. 7), presses the pushbutton valve 63, to open pipe 71 to air under pressure from reservoir 46. Such air passes into pipe line 49, activating the cylinder 47, which through lever 72 changes the position of the cock 53 to admit hydraulic fluid from pipe 57 through 57" into pipe 73 which leads to the cylinders 25, 26, which operate to close doors 24, 23, thus enclosing the drum 36a' in the forming chamber 2 while the platforms 29', 30' remain outside as shown in FIGURE 3.

When the paste applying operations inside of the forming chamber 2 are completed, the doors 23 and 24 must be opened. To this end the cocks 130 and 131 will reverse as shown in FIG. 8. Then the pushbutton valve 64, positioned on a control panel is operated to conduct air from the reservoir 46 through pipes 74 and 75. In button valve 59 the hydraulic fluid will be shut off since the button is not pressed by the butt end of lever 76" (see FIG. 8). However, the pushbutton 58 is pressed by lever 76 of paste cock 130 so that compressed air will pass through the pipe 50, to the cylinder 47, reversing the position of cock 53. The air in pipes 57, 57' then passes to pipe 77 and thence to the cylinders 25 and 26, whose pistons will be moved to open the doors 24 and 23 (FIG. 8). The function of pushbutton valves 58 and 59 is to prevent untimely manual operation of pushbutton 64 from opening the forming chambers at an unappropriate moment. Only when the paste cocks 130 or 131 have operated the pushbutton valve 58 or 59, is it possible to open the doors of chambers by pressing the button 64.

The closing of the sliding doors 19, 20, 23, 24 is always initiated by the pressure of springs 67, 68, 69, 70 on the platforms 28, 30, 28', 30' against the pushbutton valves 60, 61, 62, 63, while the opening of said doors is initiated by pressing the button 64. The pushbutton valve 58 lets the air out of the duct 50 at one end of the cylinder 47 and the pushbutton valve 62 lets the air out of the duct 49 at the other end of the cylinder 47. Similarly, the pushbutton valve 59 vents the air out of the duct 51 connected to one end of the cylinder 48, while the pushbutton valve 60 vents the air out of the duct 52 connected to the opposite end of the cylinder 48. In this way, the cylinders 47, 48 are vented to permit their pistons to reciprocate as pressure is applied first to one end and then to the other.

The foregoing paragraphs describe the movements of doors 23, 24 for forming chamber 2. In the same FIGURES 7 and 8 are also shown the pipe 51, controlled by pushbutton valve 59 to give passage to compressed air to operate the cylinder 48, and also the pipe 52 controlled by pushbutton valves 60, 61 to operate cylinder 48 in the opposite direction. By these movements, the cock 54 is turned in one or the other direction and the compressed air passes through pipes 116 or 117 to move the cylinders 21 and 22, so that they, at appropriate times, open or close the doors 19, 20 to forming chamber 1.

Figure 9:
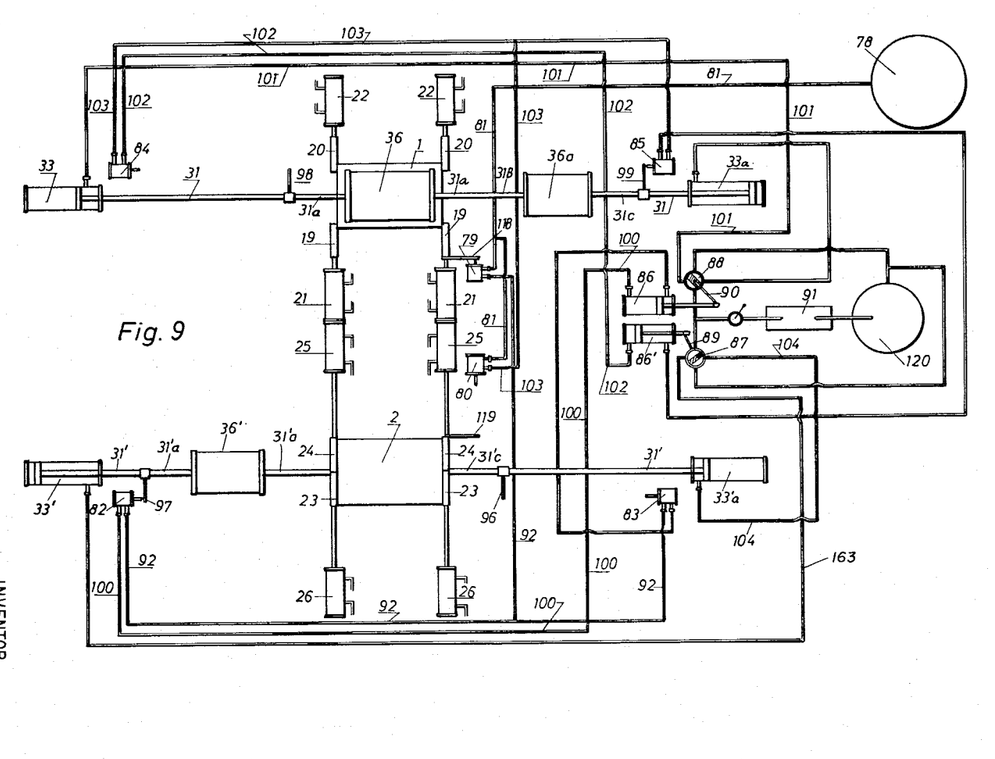
FIG. 9 is a diagram of the hydraulic and air pipe circuit, with its cocks and operating cylinders or jacks which command the movements of the forming molds into and out of the chambers as well as the synchronization of these movements with the opening and closing of the doors.
Figure 10:
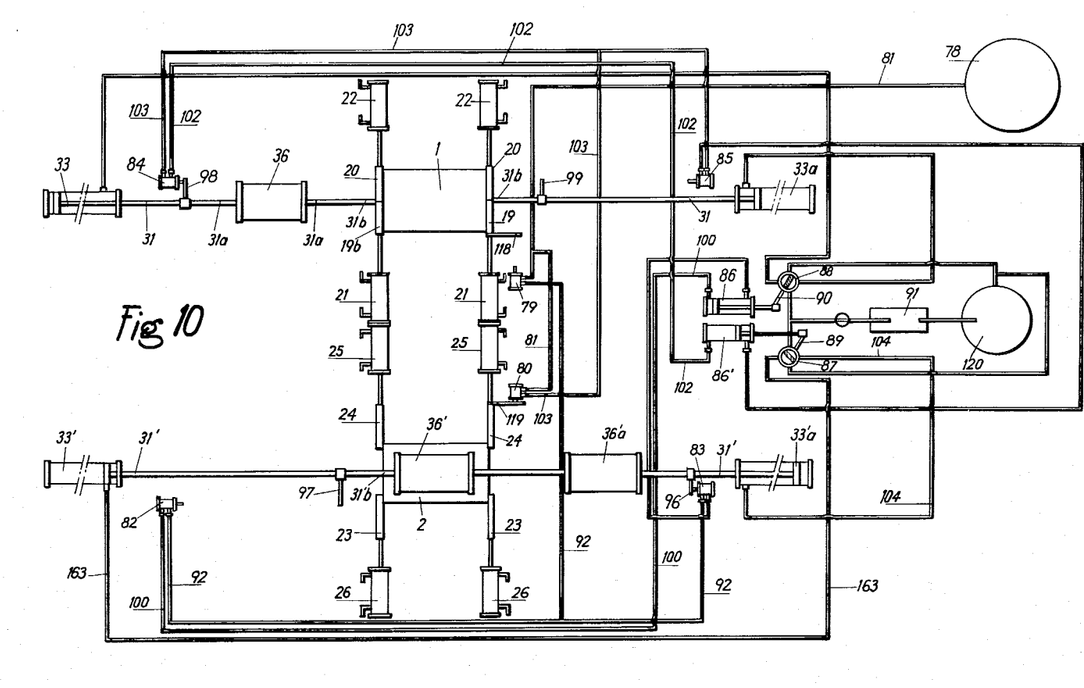
FIG. 10 is a diagram similar to FIG. 9 but with the doors of the molding chambers and also the molds in different positions.

In FIGURES 9 and 10 are represented the two conditions of the pneumatic system for automatic movements of the entrainment axles 31 and 31', the axle portions 31a and 31b which support the cylindrical drums 36, 36a on the platforms 28, 29, and 30 (FIG. 2), as well as the movements of axle portions 31a' and 31b' supporting drums 36', 36a' on the platforms 28', 29', 30' (FIG. 3).

This automatic system includes a compressed air reservoir 78 (FIGS. 9 and 10). Two pneumatic pushbutton valves 79, 80 are arranged to be operated upon opening of the doors 19 and 24 of the forming chambers, to which end they are provided with butts 118, 119. The pushbutton valves 79, 80 are connected to the reservoir 78 by pipes 81. Other pneumatic pushbutton valves 82, 83, 84, 85 are placed at the run ends of the tubular axles 31, 31'. The pneumatic cylinders 86, 86' when operated, change the positions of the hydraulic four-way cocks 87, 88 by means of the levers 89, 90, allowing compressed hydraulic fluid through these cocks, furnished by the pressure pump 91 fed from the tank 120. The hydraulic single action cylinders 33, 33a displace the tubular axles 31 while similar cylinders 33' and 33a' displace the axles 31'.

Butts 96, 97, 98, 99 are placed on the manual axles to engage and press the pushbutton valves 82, 83, 84, 85.

When the door 19 opens and the butt 118 presses upon button valve 79, the latter is opened and allows the air, stopped at button valve 80, which is closed, into the pipe 92, thereby reaching the pushbutton valves 82 and 83; but only button valve 82 will be in position of free passage because engaged by the butt 97, the axle 31' being in its extreme left position, as viewed in FIG. 9. Consequently, the other equal axle 31 will also be in its extreme position, but in the opposite direction, and pressing the butt 99 against pushbutton valve 85. Through the opened button valve 82 the air will be allowed into the pipe 100, reaching and operating the pneumatic cylinder 86 to move cock 88 to the position shown in FIG. 9. This enables the compressed air from the pump 91 to pass to cylinder 33, through pipe 101, thus starting the axle 31 to move to the left until the butt 98 engages the pushbutton valve 84, that is, passing from the condition shown in FIGURE 9 to that shown in FIGURE 10.

Thus, the pushbutton valves 79 and 80 exercise a function of control for moving the axles 31, 31'.

In the described condition of butt 98 pressing the button valve 84 (FIGURE 10) and, therefore, in position of free passage, no air pressure reaches it as push button valve 80 is closed (as per FIGURE 9). To open button valve 80 it is necessary to open the door 24 of the forming chamber 2. When this happens, air under pressure comes through the pipe 103 and passes through the pushbutton valve 84, already opened as described above, and through pipe 102 reaches the pneumatic cylinder 86', reversing the position of cock 87 through the lever 89, FIG. 10. Then, the hydraulic fluid under pressure enters the cylinder 33a' through the pipe 104 and the tubular axle 31' starts to move to the right until the butt 96 engages the pushbutton valve 83, moving thus to the position shown in FIG. 10. The described cycle repeats itself with alternating right and left movements of the axles 31, 31', to draw in and out of the forming chambers 1 and 2 the forming drums 36, 36a, 36' and 36a'.

The complete operation of the described device is as follows: In an open, palette-type, mixing tank, cement, asbestos and water are placed in the proportions and fluidity condition customarily usual for the manufacturing of fibro-cement laminates with machines of circular screen type. A pressure pump takes the paste from this tank and transfers it to another closed one, provided with a manometer and with a set of helicoidal paddles, which keep the paste in suspension and which move at few revolutions per minute in order not to injure the asbestos fibers. Pressure air coming from a compressor is injected into this tank, yielding the paste injecting tank needed to feed the device, the injector and its elements being not illustrated because they are of a known type. The pressure tank containing the paste is connected to the pipes 3 and 4, FIG. 1, whose by-pass valves or cocks 5 and 11 will be kept closed while the compressor reaches the necessary pressure inside the tank.

Figure 1:
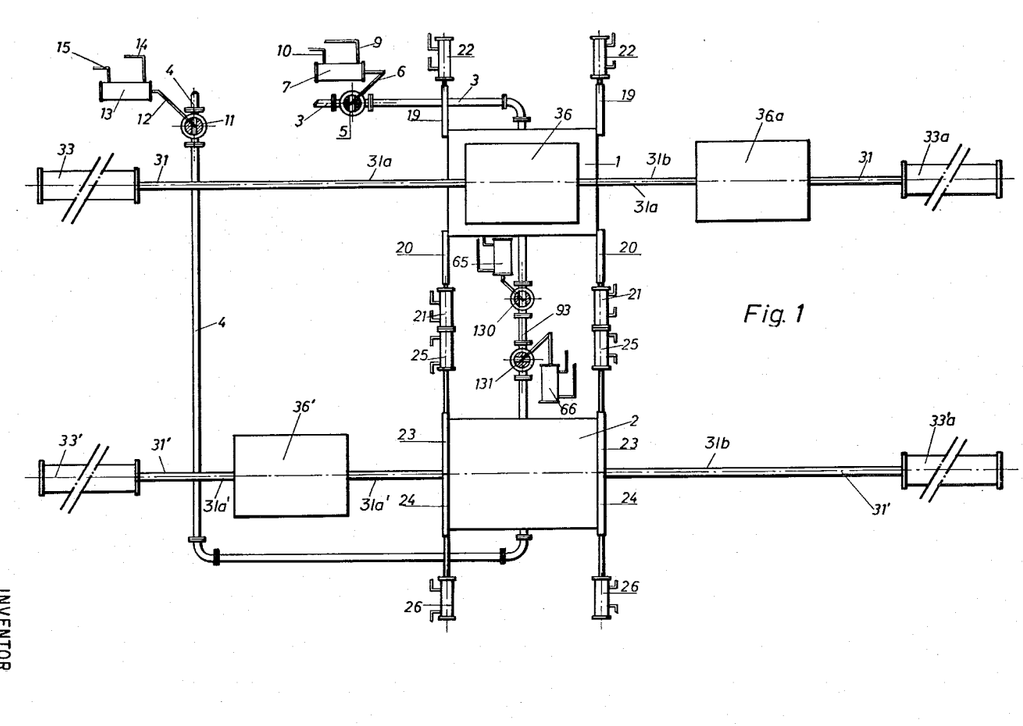
FIG. 1 is a plan view of the general arrangement of elements in an installation of a double forming chamber, showing the paste supply tube circuit.

In FIGURES 1, 2 and 3 is shown the position of the forming chambers 1 and 2. In chamber 1, the doors 19 and 20 are open, while in chamber 22 the doors 23, 24 are closed, that is in favorable position to receive the paste. Inside of closed chamber 2, FIG. 3, are placed a plurality of forming elements 36a' and 41', equal to elements 36 and 41. Outside the chambers 1 and 2 there are another two elements 36a and 36', which have their tubular axles connected to 36 and 36a', ready to perform their intended work function. When valve 11 (FIG. 1) opens, moved by the pneumatic cylinder 13 previously operated by a pneumatic pushbutton valve placed on a control table or panel, the paste will move freely along the pipe 4 to chamber 2, filling the cavities left between the forming ensemble 36a' and its satellites 41', inside of said chamber. The air contained in the closed chamber 2 will not be compressed, as will be described later, but pushed by the paste passes through the different layers of linings composing the permeable porous walls of the drum 36a' and mold 41' (FIG. 2) and, as seen in FIGURES 2, 4, 5 and 6, exits through the openings in the axles and sleeves.

The air contained in the chamber will exit until the paste reaches the level corresponding to 92 in chamber 1, FIGURE 11, which the highest level of the ensemble of tube molds placed in the interior of chamber. The air remaining in the space situated between level 92 and the upper surface of the chamber has no possible escape and, therefore, is compressed by pressure of the paste which is filling the chamber. It is now necessary to know when there will be a sufficient amount of paste in chamber 1 or 2. This happens when the air pressure not allowed out of a chamber is equal to the pressure in the paste injecting tank and will be indicated by a suitable manometer not shown. When compartment 2 is filled with paste under the same pressure as that in the injecting tank, the motor on the platform will be actuated (FIGURE 3), and the axle 31' will be given a rotating movement which it transfers to the drum 36' inside the compartment 2. The end disc 35' of said drum 36a' is in contact at its edges with the disc 43 of the molds 41', forcing them to turn. The axles 37' are so arranged as not to move during the said turn.

It is pointed out that the discs 43' and 35', touching only at their perimeters, define a wide free space 129 between the surfaces of the drum 36' and of the roller satellites 41'. This space is sufficient also to prevent the respective fibro-cement layers, with which said main drum and roller satellites will cover themselves, from touching each other, so that they do not act as self-calenders.

The pressure exercised by the paste upon the permeable surfaces or screen of the drum 36a' and upon the also permeable surfaces of the ensemble of molds 41', causes the water of the paste to filter through and follow the air out of the chamber in the manner already explained. In this way, the paste, which is in suspension in the water, is forced to adhere to the permeable surfaces, or screen, of the drum 36a' and of the tube molds 41', which surfaces become successively covered by the adhered paste, a layer of the desired thickness is formed. This thickness is determined as a function of the time and of the pressure in the interior of the chamber.

The paste adhered to drum 36a' and to the rollers 41' will still contain a great deal of water, but will be of higher density than the rest of the paste in the chamber 2, and very soft.

A moment will come when the pressure in chamber 2 will not adhere any more paste upon the drum and the rollers acting as molds, the pores through which the filtering of water takes place having been obturated by the paste. Through the interior of the tubular axle 31b' no water will then flow, this being easily visible at the outside outlet 147 (FIG. 6). At this moment the doors of compartment 1 will be closed with another ensemble inside of forming molds similar to those in chamber 2. The valve 11 will then be closed and the valves 131 and 130 opened, the latter valves being in the pipe line 93 connecting the two forming chambers 1 and 2. Through the valves 94, FIG. 3, in the upper part of the compartment 2, air is injected to maintain the pressure and to cause the paste to be transferred from chamber 2 into chamber 1, the paste having been kept always at the same level 92 in the former by continuous replacement of paste to compensate for the water filtered through the permeable walls of the molds. When the pressure in chambers 1 and 2 are equal, the paste which was in chamber 2 will have been transferred into chamber 1, reaching the same level which it had in the former.

At this moment the valve 130 will close, the valve 5 will open and in the chamber 1 will start the same paste extending and adhering cycle as previously described for chamber 2.

When the forming of pieces in chamber 1 is finished, the paste in it will be transferred back to 2, where another forming ensemble 36', 41' will be ready to receive the paste similar to the ensemble which has been removed from said chamber with the tubes already molded and which is being dismounted outside the chamber 2. The removal of one ensemble simultaneously inserts a new ensemble of forming molds into a chamber and then closes the doors of the chamber. In the meantime, in chamber 1, when the paste has gone completely into chamber 2, that is, when their pressures have equalized, the valve 131 is closed, the pressure is eliminated, the doors 19 and 20 are opened and, operating the pneumatic cylinder 33, a longitudinal move is imparted to the ensemble, in consequence of which it moves out of the chamber with the drum walls covered with fibro-cement paste. The platform 29 goes through the compartment 1 and the other ensemble, that is the one referenced 36, 41 included between platforms 29 and 30 moves to take its place in the interior of compartment 1. The doors are then closed in expectation of receiving the paste coming from chamber 2 and so successively and alternately, the process is repeated in each compartment.

In the compartment 2 when the paste has been removed and replaced by air under pressure, while both the tube forming drum 36a' and the cylinders 41' have been kept continuously rotating around their axles. It will be visible at axle outlets 147 that water emerges first and then atomized water. This is because of the over quantity of water contained in the adhered paste in the cylinder and the tubes and which is being ejected by the air under pressure while it compresses the paste to make it more compact. When no more atomized water comes out through outlets 147 it is time to disconnect the electric motor on the platform 30', thus stopping rotation of the forming ensemble. The valves 94, FIG. 11, for the injection of air will be closed and the pressure in the interior of the chamber 2 will disappear through the tubular axles and the outlets 147. The doors 23, 24 of the compartment 2 will open. The hydraulic cylinder 33a will be operated and the ensemble of forming elements, whose surfaces are covered by a compact layer of cement-asbestos, moves out of the chamber with its axles supported by the platforms 29', 30' which slide over the rails, its place being occupied by the forming cylinder whose axle is supported by platforms 28', 29'. As soon as the ensemble 36a', 41' is out of chamber 2, the molds 41', which are situated around the upper part of the drum 36a' and which are each covered with a tube of fibro-cement, will be dismounted. Then a calendering operation will be effected as necessary to extract the interior mold core 36a'.

Proceeding in the above explained way, there is obtained on the ensemble of forming elements which were enclosed in chamber 2, a fibro-cement tube per each mold 41' and a plate or sheet on the drum 36a' to be corrugated or to use as plain sheet or in any other desired way.

After the drum 36a' has been set free of all the tube molds around it, the plain sheet which covers it will be cut along a generatrix of the drum, either by mechanical means or by hand, and unrolled and cut into pieces in the same way as customary in conventional processes.

If it is wished to produce tubes only, the cylinders 36 and 36' will be covered with a non-permeable cloth, a thin rubber sheet or any other water-tight means.

If no tubes are wished, the molds 41, 41' will not be placed about the cylinders and the openings of stoppers 40 will be blocked.

It is appropriate to mention that the pieces manufactured with the process and apparatus described, have the direction of asbestos fibers oriented normal to the generatrixes, and they are also provided with the necessary feltering. To this end, the tangential speed of a point situated on the surface of the drums 36, 36' must be 0.50 meter per second, approximately.

If it is wished to obtain sheets without a direction of the fibers, that is to say, sheets having the same strength in all directions, the motors on the platforms 28, 30, 28', 30' may be stopped or, the movement of the axles 31a, 31b, 31a', 31b' but, at the same time, to impart from the respective platforms, a swinging or reciprocating movement to the axles supporting the forming elements, 36, 36a, 36', 36a' and its satellites 41, 41' which are in the interior of the forming chambers. This last proceeding is the most convenient one, if sheets without fiber direction, but with perfect bond feltering between fibers, are desired.

Although a certain specific embodiment of the invention has been shown and described, it is obvious that many modifications thereof are possible. The invention, therefore, is not to be restricted except insofar as is necessitated by the prior art and by the spirit of the appended claims.

I claim:

1. Process for the manufacture of fibro-cement articles comprising the steps of placing a molding body with a permeable tubular wall into a closed chamber, introducing a fluid asbestos cement paste including water under pressure into said chamber to cover said molding body, continuously moving said molding body in the paste until a layer has adhered to the surface thereof while retaining said chamber fixed against movement, injecting compressed air to said chamber to expel the excess paste from the chamber and water from the adhered layer through said permeable wall to drain from the chamber, and finally, when the paste layer has sufficiently compacted, removing the body with its compact layer from the chamber.

2. Process for the manufacture of fibro-cement articles comprising the steps of placing a molding body with a permeable cylindrical wall and satellite bodies thereabout also having cylindrical permeable walls in a closed chamber, introducing fluid asbestos cement paste and water under pressure into said chamber to cover said bodies, rotating said molding and satellite bodies about their own axes in the paste until layers of paste have adhered to the surfaces of said molding body and its satellites, injecting air under pressure to said chamber to expel the excess paste from the chamber and to drain water from the adhered layers through said bodies and from the chamber, and finally, when the paste layers have sufficiently compacted, shutting of the compressed air and removing the bodies with their compacted layers from the chamber.

3. Process for the manufacture of fibro-cement articles comprising the steps of placing a molding body with a permeable tubular wall into a closed chamber, introducing a fluid asbestos cement paste including water under pressure into said chamber to cover said molding body, continuously moving said molding body in the paste until a layer has adhered to the surface thereof, injecting compressed air to said chamber to expel the excess paste from the chamber into a second chamber containing a second molding body, continuing said compressed air injection until water from the adhered layer has drained through said permeable wall to an outlet from the first chamber and the paste layer has become sufficiently compacted, removing the body with its compact layer from the first chamber, continuously moving said second molding body in the paste under pressure in the second chamber, and injecting compressed air into the second chamber to expel the excess paste and return said paste to the first chamber in which a third molding body has been inserted.

4. Apparatus for the manufacture of fibro-cement articles comprising a chamber having at least one door movable to open and to close and seal said chamber, fluid pressure means for moving said door, a molding body having a cylindrical permeable wall and satellite molding bodies also having cylindrical permeable walls removably mounted about the periphery of said body, means for moving said moding and satellite bodies into and out of said chamber when said door is moved to open the chamber, means for injecting a fibro-cement paste including water into said chamber under pressure, means for rotating said molding and satellite bodies about their own axes in said paste, means for injecting compressed air into said chamber to expel excess paste therefrom and to drain water from paste layers adhered to said molding and satellite bodies through said permeable walls.

5. Apparatus for the manufacture of fibro-cement articles comprising a first and second chamber connected by a conduit having a valve and each chamber having at least one door movable to open and to close and seal its chamber, fluid pressure means for moving said doors, a molding assembly positioned in each chamber and including a molding body having a cylindrical permeable wall and satellite molding bodies also having cylindrical permeable walls removably mounted about the periphery of said molding body, means for moving said molding assemblies into and out of their respective chambers when said doors are moved to open the chambers, means for injecting a fibro-cement paste including water into said first and second chambers alternately under pressure, means for rotating said molding and satellite bodies in each assembly about their own axes in said paste, means for injecting compressed air into said first chamber to expel excess paste therefrom into the second chamber and to drain water from paste layers adhered to said molding and satellite bodies through said permeable walls, and means for injecting compressed air into said second chamber to expel excess paste therefrom into said first chamber after paste layers have adhered to the molding assembly in the second chamber.

6. Apparatus according to claim 5 wherein each of said molding assemblies comprises a molding body mounted on a first tubular shaft having at least one water drain opening positioned within the tubular body, each of said satellite bodies also having tubular shafts and conduits connecting the tubular shafts of the satellite bodies to the interior of said first shaft.

7. Apparatus according to claim 5 wherein each of said chambers is provided with two of said molding assemblies so connected to each other that when one assembly is automatically moved into a chamber the second assembly with adhered paste layers is moved out for removal of the satellite bodies and adhered paste layers and replacement by different satellite bodies.

8. Apparatus according to claim 6 wherein the molding body and satellite bodies of each assembly are each formed with end discs of greater diameter than their respective permeable cylindrical walls, the peripheries of the satellite discs frictionally engaging the periphery of the associated molding body discs for rotation thereby and to leave spaces between the satellite bodies and the molding body for adherence of paste layers.

9. Apparatus according to claim 6 wherein each of said satellite bodies of each assembly is mounted on a pair of hollow radial arms whose inner ends are fixed to and communicate with the hollow tubular shaft of the associated molding body, the outer ends of each of said arms having a piece pivoted thereon, said pieces having fork shaped ends receiving the ends of the shafts of the satellite molds, a tilting piece hinged to each of said pieces, springs fixed at one end to the radial arms and at the other ends to said tilting pieces, a plate provided with a perforated stopper secured to each tilting piece so that the stopper covers the opening at the end of each shaft of the satellite bodies, a flexible tube connected to the opening of each said stoppers to the interior of one of said hollow radial arms, and a second spring releasably urging each of said tilting pieces and stoppers against the open shaft ends of their respective satellite bodies.

10. Apparatus according to claim 7 wherein each pair of molding assemblies for a given chamber is mounted on a long tubular axle comprising said molding body shafts and interconnecting tubular sections.

11. Apparatus according to claim 10 wherein said long tubular axles are mounted so that certain of said sections can rotate, said axles being supported by platforms on cars with wheels running over rails which pass into and out of each chamber, said cars carrying electric motors for rotating said axle sections.

12. Apparatus according to claim 6 wherein each of said molding and satellite bodies have a plate rolled in spiral form starting from its cylindrical permeable wall and terminating at the central shaft thereof, said shafts of the molding bodies being surrounded by a perforated sleeve having an internal recess which forms, together with the shaft, a cavity communicating with the bore of said shaft for draining water.

13. Apparatus according to claim 10 wherein each one of said long tubular axles is connected at both ends with the piston rod of a hydraulic pressure cylinder forming part of said means for moving the molding assemblies into and out of said chambers.

14. Apparatus according to claim 9 wherein is additionally provided a pair of frames mounted on wheels and movable on rails, each said frame having two parellel gradient upper bars for slideably supporting said satellite bodies by their tubular shafts, each frame having two curved bars forming two parallel arches supported by arms, said frames facing each other at opposite sides of the shaft of the molding body of a molding assembly, and means to move said frames so as to engage said curved bars with said tilting pieces of said satellite bodies whereby to release the satellite bodies one by one on to one frame while feeding new satellite bodies in turn from the other frame for clamping on the molding body of said assembly.

15. Apparatus according to claim 14 wherein said pair of frames are provided with rollers and a pair of endless belts one of which contacts the molding body to rotate it and the other of which moves a fibro-cement plate when formed away from said molding body after the plate has been cut.

References Cited by the Examiner
UNITED STATES PATENTS

| | | | |
|---|---|---|---|
| 804,432 | 11/1905 | Rivers | 162—218 |
| 1,673,047 | 6/1928 | Hawley | 162—387 |
| 1,817,923 | 8/1931 | Johnson | 162—228 |
| 2,101,921 | 12/1937 | Shaves | 162—228 |
| 2,398,016 | 4/1946 | Lemont et al. | 162—415 |
| 2,539,767 | 1/1951 | Anderson | 162—228 |
| 2,552,458 | 5/1951 | Reiskind et al. | |
| 2,700,326 | 1/1955 | Curtis | 162—228 |
| 2,809,394 | 10/1957 | Harvey. | |
| 2,932,604 | 4/1960 | Curtis | 162—388 |
| 3,003,553 | 10/1961 | Colliva | 162—286 |
| 3,028,911 | 4/1962 | De Lear | 162—228 |

DONALL H. SYLVESTER, *Primary Examiner.*

JOHN H. NEWSOME, *Assistant Examiner.*